United States Patent Office 2,845,799
Patented Aug. 5, 1958

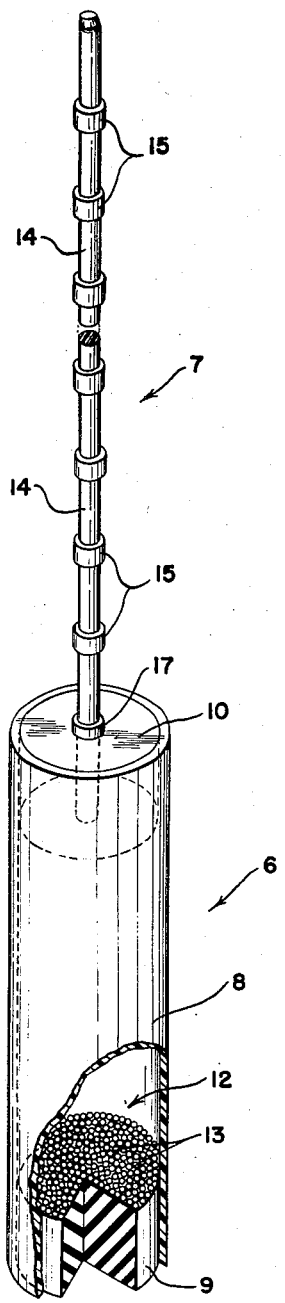

2,845,799

RUGGED SENSITIVE HYDROMETER

Walter A. Emanuel, Charles M. Holstrom, and Kenneth O. Sweeney, Anaconda, Mont.

Application February 21, 1955, Serial No. 489,345

2 Claims. (Cl. 73—448)

The present invention relates to hydrometers. More particularly, it relates to a hydrometer of rugged character that may be left floating freely in a solution the specific gravity of which is to be measured, and which is capable of withstanding rough treatment without injury or impairment of its accuracy or sensitivity.

The chemical compositions of solutions such as are used in various industrial processes are quite often determined by measurement of the specific gravity of the solution with a hydrometer. Hydrometers offer the advantages that they are simple to operate so that the services of a skilled technician are not required, and no considerable amount of time is required to operate them. Additionally, they are quite inexpensive. However, hydrometers heretofore commonly used suffer from the disadvantage that they are fragile, and, to avoid making them too fragile for industrial use, are constructed in such a way that they are not very sensitive and yield a specific gravity reading that involves a considerable margin of error. A further consequence of the fragile character of such hydrometers is that they must be handled carefully and kept, when not in use, in a safe place. Both of these conditions make them inconvenient to employ for routine checking of solution concentrations at frequent intervals. A further practical disadvantage is that the fragile hydrometer is likely to be broken and hence unavailable at times when it is particularly needed for use. These disadvantages incident to the use of hydrometers are of such significance that, although the specific gravity of a solution may offer a satisfactory indication of its composition, other more costly means, for example electrical conductivity measurement or chemical analysis, are often resorted to for routine control of the composition of the solution.

A typical case is the determination of the composition of an aqueous acidic solution used in the electrolytic recovery of zinc. The acid concentration of the solution varies from 8% to 11%, and on hydrometers such as have been heretofore available and suitable for industrial use this concentration range corresponds to a distance of only about ¾ inch on the stem gauge. Careful control of the acid concentration of the solution is important in order to insure operation of the process with maximum efficiency and economy; and since the acid concentration cannot be determined accurately enough with conventional glass hydrometers which at the same time are rugged enough for routine plant use, operators of electrolytic zinc plants have adopted costly apparatus such as recording devices which measure conductivity to determine acid concentration, or have relied on relatively slow chemical analysis methods, or have operated simply by estimations based on knowledge and experience and checked at relatively infrequent intervals by chemical analysis.

The present invention provides a hydrometer of high sensitivity and exceptional ruggedness, which is not subject to the disadvantages of hydrometers as heretofore constructed and commonly used, and which is considerably less expensive than such heretofore known hydrometers. The hydrometer of the invention is a sensitive hydrometer of such rugged construction that it may be left floating freely in the solution the specific gravity of which is to be determined, without attention and without fear that it will be injured by blows or other rough treatment which would destroy a conventional hydrometer. The new hydrometer comprises a bulb portion of rugged construction, and a stem gauge formed of a thin solid rod of resilient plastic material having bands surrounding its outer surface for indicating the specific gravity of the solution in which the instrument is immersed. Advantageously the bulb portion is a hollow cylinder of durable resinous plastic material closed at its lower end and with a weight therein, and having an apertured stopper formed of elastic material fitting in its upper end. The stem rod then is inserted in the stopper aperture and is thereby held upright.

The invention may be better understood by reference to the single figure of the accompanying drawing wherein a hydrometer according to the invention is shown with a part of the bulb broken away in order to better reveal the construction of the instrument.

The hydrometer shown in the drawing comprises a bulb portion 6 and a stem gauge 7. The bulb portion is formed of a hollow cylinder 8 formed of vinyl plastic, or other plastic material which is resistant to the solution in which the hydrometer is to be immersed. A solid stopper 9 of rubber or other suitable material is positioned in the cylinder 8 to close the lower end thereof, and an apertured stopper 10 of rubber or other suitable material is fitted snugly into the upper end of the cylinder 8. A weight 12, made up of shot particles 13, is positioned within the cylinder in order to obtain the desired relationship of volume of the bulb portion to weight of the bulb portion.

The stem gauge 7 comprises a thin solid rod 14 of a resilient plastic material such as a methyl methacrylate polymer. Markers 15, which may be formed of short lengths of rubber tubing, surround the stem at spaced intervals to provide visual indication of the specific gravity of the solution. The lower end of the stem gauge 7 is inserted into the aperture of the stopper 10, and the stopper 10 supports the stem gauge in an upright position. A rubber bushing 17 may be provided, if necessary, to adapt the rod 14 to the standard size opening in the apertured stopper 10.

The high sensitivity of the hydrometer of the invention is attributable to the construction of the stem gauge. As the stem gauge is formed of a thin solid rod of resilient plastic, it may be made very small in diameter so that considerable vertical movement of the rod is accompanied by only a small change in the amount of liquid displaced.

The following example of the hydrometer according to the invention, for use in routine control of the composition of the acid electrolyte in an electrolytic zinc plant tank house, illustrates its sensitivity and ruggedness. The cylinder 8 is a 6 inch length of polyvinyl chloride plastic tubing, 1 3/16 inches in inside diameter by ⅛ inch in wall thickness, and the stoppers 9 and 10 are conventional #6 pure gum rubber stoppers. The weight 12 consists of 80 grams of lead shot. The stem gauge 7 is a solid rod, 3/16 inch in diameter and about 11 to 12 inches long, of polymerized methyl methacrylate plastic. The markers 15 are formed of ⅛ inch rubber tubing, spaced about one inch apart, and grip the rod so that they remain in place, but may conveniently be forced manually longitudinally of the rod to the desired settings. When this hydrometer is used to measure the specific gravity of an aqueous sulfuric acid zinc plant solution having an acid concentration which may range from 8% to 11%, this acid concentration range corresponds to a distance of about 10 inches on the stem gauge. Once the marker bands 15 have been set in correct positions, the acid concentration can be read at a glance, and from a distance, to less than ½% by simply counting the number of markers above the solution level. With the conventional glass stem hydrometers heretofore commonly used for this service, this acid concentration range corresponds to only about ¾ of an inch on the stem.

The hydrometer of the invention is of such rugged construction that it may be left floating freely in the solution in which it is used. Thus, when used to measure the specific gravity of electrolytic zinc plant electrolyte, a hydrometer according to the invention may be left floating in each electrolytic cell of the tank house. Although the hydrometer may frequently be bumped against the sides of the cell, or may be bumped during operations performed in connection with operation of the cell, or may otherwise be roughly handled, it is not injured by such occurrences. Replacement costs are therefore insignificant, and the instrument can be counted on to be available when and where desired. Moreover, as the hydrometer of the invention may be left floating in the solution, the specific gravity of the solution may be determined at any time merely by glancing at the hydrometer without the necessity of first placing the instrument in the solution.

We claim:

1. A rugged but sensitive hydrometer adapted to be left floating freely in a solution comprising a bulb portion of rugged construction, a stem gauge consisting of a thin solid rod of resilient plastic material extending upwardly from said bulb portion, and bands snugly embracing the outer surface of said stem for indicating the specific gravity of said solution, said bands being movable along said stem for the purpose of calibrating the hydrometer.

2. A rugged but sensitive hydrometer capable of being rapidly recalibrated and adapted to be left floating freely in a solution, comprising a hollow cylinder of a resinous plastic material closed at its lower end and having an apertured stopper formed of elastic material fitting snugly in the upper end thereof, a weight in said cylinder, a stem gauge formed of a thin solid rod of resilient plastic material, the lower end portion of said rod being inserted in the aperture of said stopper and supported thereby in an upright position, and adjustable bands formed of elastic material snugly surrounding said stem at spaced intervals, thereby providing visual indication of the specific gravity of the solution, said bands being movable along said stem for the purpose of calibrating the hydrometer.

References Cited in the file of this patent

UNITED STATES PATENTS

| | | |
|---|---|---|
| 1,019,453 | Goodnow | Mar. 5, 1912 |
| 2,067,914 | Godfrey | Jan. 19, 1937 |
| 2,221,913 | Edelmann | Nov. 19, 1940 |
| 2,688,867 | Trainor | Sept. 14, 1954 |
| 2,713,258 | Walton | July 19, 1955 |